Figure 1:
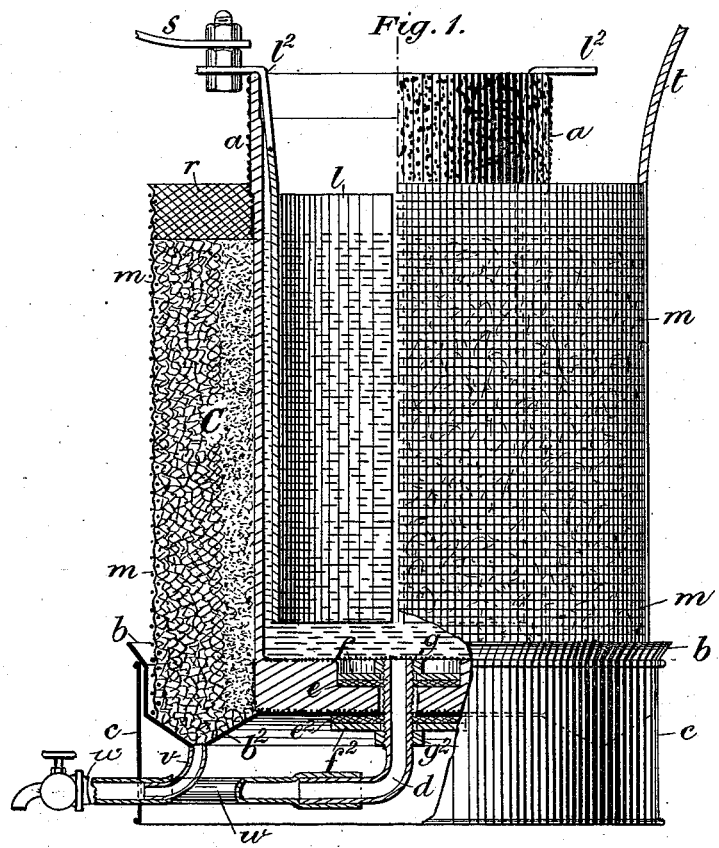

(No Model.)

W. WALKER, Jr. & F. R. WILKINS.
PRIMARY VOLTAIC BATTERY.

No. 524,291. Patented Aug. 7, 1894.

Witnesses:—
Richard Skerrett
Arthur John Powell

Inventors:—
William Walker Junr
Frank Richard Wilkins

UNITED STATES PATENT OFFICE.

WILLIAM WALKER, JR., OF BIRMINGHAM, AND FRANK RICHARD WILKINS, OF HANDSWORTH, ASSIGNORS OF ONE-THIRD TO JABEZ LONES, OF SMETHWICK, ENGLAND.

PRIMARY VOLTAIC BATTERY.

SPECIFICATION forming part of Letters Patent No. 524,291, dated August 7, 1894.

Application filed June 4, 1894. Serial No. 513,474. (No model.) Patented in Belgium February 7, 1894, No. 108,431, and in Austria-Hungary April 27, 1894, No. 1,246.

*To all whom it may concern:*

Be it known that we, WILLIAM WALKER the Younger, of Birmingham, and FRANK RICHARD WILKINS, of Handsworth, England, subjects of the Queen of Great Britain, have invented certain new and useful Improvements in Primary Voltaic Batteries, (for which we have obtained Letters Patent of Belgium, No. 108,431, dated February 7, 1894, and of Austria-Hungary, No. 1,246, dated April 27, 1894;) and we do hereby declare that the following is a full, clear, and exact description of the invention, which will enable others skilled in the art to which it appertains to make and use the same.

Our invention has reference to single liquid primary voltaic batteries and has for its object to prevent wholly or in great part the condition in the said batteries called by electricians polarization a condition by which the electro-motive force of the said batteries is much reduced. The said polarization is produced by the evolution of hydrogen at the negative element of the battery and in double liquid batteries such for example as Grove's battery and Daniel's battery is suppressed in the former by nitric acid and in the latter by a solution of sulphate of copper the nascent hydrogen combining in the former case with the oxygen of the nitric acid and in the latter case replacing the copper of the sulphate of copper.

In constructing a single liquid battery according to our invention we employ amalgamated zinc as the positive element and carbon as the negative element, the electrolyte or exciting liquid being preferably a strong solution of caustic soda or potash. We do not however limit ourselves to the use of any particular exciting liquid.

We arrange the parts of the battery preferably in the following manner: The amalgamated zinc, either in the form of a solid or a hollow cylinder, is placed in a porous cylindrical cell. The porous cell is situated concentrically in a casing of wire gauze of about double the diameter of the porous cell. We fill the annular space between the wire gauze casing and the porous cell with carbon, that portion of the carbon in contact with the porous cell being in fine powder while that portion of the carbon in contact with the wire gauze casing is in the form of a coarse powder or grains larger than the meshes of the wire gauze. The oxygen of the atmospheric air contained in the pores of the carbon combines with the nascent hydrogen and prevents polarization. The wire gauze is preferably made of copper and the carbon is preferably gas retort carbon or carbon of the kind used for making the rods of electric arc lamps. The conducting wires are connected to the zinc and wire gauze respectively. The battery as described is placed in a shallow metal pan supported on a hollow cylinder or case of sheet iron or tin plate. Any liquid oozing through the carbon is collected in an annular trough formed in the metal pan.

Provision is made for changing the exciting liquid when it is exhausted by withdrawing it from the bottom of the porous cell through a pipe and stopcock.

Figure 2:
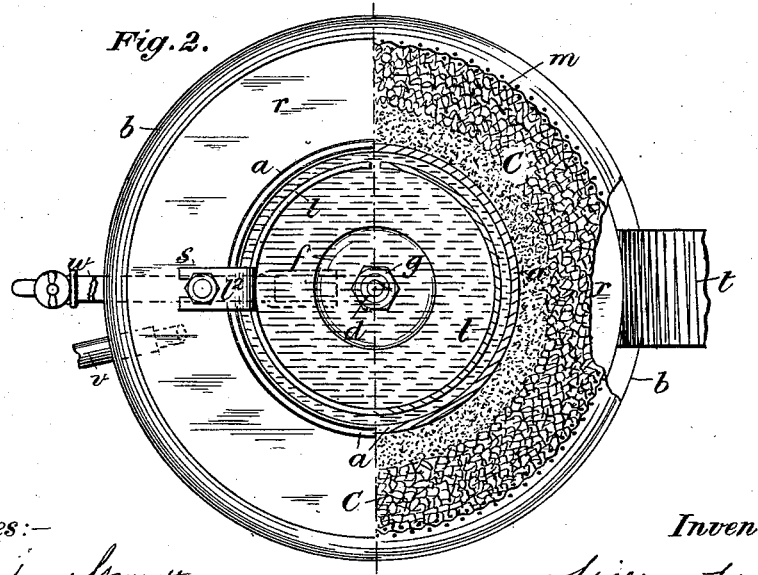

Figure 1 represents partly in elevation and partly in vertical section a primary voltaic battery constructed according to our invention, and Fig. 2 represents the same partly in plan and partly in horizontal section.

The same letters of reference indicate the same parts in both figures of the drawings.

$a$ is the porous cell containing the exciting liquid of the battery preferably a strong solution of caustic soda or caustic potash. The said porous cell $a$ is supported on and fixed to the raised bottom of a sheet metal pan or vessel $b$ supported in the open sheet metal cylinder $c$. The porous cell $a$ and metal pan $b$ have holes in their bottoms the said holes coinciding with one another. The porous cell $a$ is secured to the pan $b$ by the elbow shaped metal pipe $d$, and india rubber washers $e$, $e^2$, metal washers $f$, $f^2$ and screw nuts $g$, $g^2$. The amalgamated zinc cylinder $l$ constituting the positive element of the battery is suspended in the exciting liquid by means of zinc strips $l^2$ made in one piece with the zinc cylinder $l$, the turned out ends of which strips $l^2$ rest on the top of the porous cell $a$.

Arranged concentrically around the porous cell $a$ is the wire gauze casing $m$ the lower end of which casing fits tightly within the pan or vessel $b$. The space between the wire gauze casing $m$ and porous cell $a$ is filled or nearly filled with powdered and coarse carbon C which forms the negative element of the battery. The powdered carbon is arranged adjacent to the porous cell $a$ and the coarse carbon which is in the form of grains larger than the meshes of the wire gauze is arranged adjacent to the wire gauze casing $m$. When the space between the wire gauze casing $m$ and porous cell $a$ has been nearly filled, the open mouth of the wire gauze casing is sealed or closed with shellac or cement $r$. The conducting wire or metal band $s$ constituting one of the terminals of the battery is connected to the zinc cylinder and the other metal band or conductor $t$ constituting the other terminal of the battery is connected to the wire gauze casing $m$ as represented.

The bottom of the porous cell $a$ and that portion of the top of the said cell $a$ standing above the wire gauze casing $m$ are glazed. The glazing of the top of the porous cell prevents wholly or in great part the creeping of the exciting liquid in the said cell over the glazed upper part.

When the porous cell $a$ is filled with the exciting liquid, the said liquid oozes very slowly through the unglazed portion of the side of the porous cell $a$ and percolates through the carbon C collecting in the annular trough $b^2$ formed by the raising of the middle portion of the bottom of the pan $b$. The said trough $b^2$ is provided with a pipe $v$ by which the liquid which slowly collects in the trough $b^2$ may run off to a vessel placed for its reception. When the exciting power of the liquid is nearly exhausted the porous cell $a$ may be emptied by the pipe $w$ connected to the elbow $d$ the said pipe $w$ being provided with a stopcock not shown in the drawings. By almost closing the stopcock referred to the partially exhausted exciting liquid may be allowed to slowly pass from the porous cell, fresh exciting liquid being supplied at a similar rate to the said porous cell at its open top.

By the action of the battery nascent hydrogen occurs on the surface of the carbon constituting the negative element of the battery and meeting with the condensed atmospheric air in the pores of the carbon combines with the oxygen of the same. The hydrogen thus never assumes a gaseous form and polarization is wholly or in great part prevented.

The voltaic battery described has an electro motive force somewhat higher than one volt and the electro motive force or potential is maintained uniform or nearly uniform until the exciting liquid is nearly exhausted.

Having now particularly described and ascertained the nature of our invention and in what manner the same is to be performed, we declare that we claim as our invention of improvements in primary voltaic batteries—

A single liquid primary voltaic battery consisting of a porous cell containing the exciting liquid in which the zinc or positive element of the battery is suspended, the other or negative element carbon in the form of powder and coarse grains, being retained in position around the outside of the porous cell by means of a wire gauze casing the whole being constructed and arranged substantially as hereinbefore described and illustrated in the accompanying drawings.

WILLIAM WALKER, JUNR. [L. S.]
    FRANK RICHARD WILKINS. [L. S.]

Witnesses:
 RICHARD SKERRETT,
 ARTHUR JOHN POWELL.